United States Patent
Searls et al.

(10) Patent No.: US 9,817,834 B1
(45) Date of Patent: Nov. 14, 2017

(54) TECHNIQUES FOR PERFORMING AN INCREMENTAL BACKUP

(71) Applicant: Veritas Technologies LLC, Mountain View, CA (US)

(72) Inventors: Kirk Searls, Maitland, FL (US); Pu Ou, Longwood, FL (US)

(73) Assignee: Veritas Technologies LLC, Mountain View, CA (US)

( * ) Notice: Subject to any disclaimer, the term of this patent is extended or adjusted under 35 U.S.C. 154(b) by 45 days.

(21) Appl. No.: 13/632,740

(22) Filed: Oct. 1, 2012

(51) Int. Cl.
*G06F 7/00* (2006.01)
*G06F 17/00* (2006.01)
*G06F 17/30* (2006.01)

(52) U.S. Cl.
CPC .............................. *G06F 17/30088* (2013.01)

(58) Field of Classification Search
CPC ......... G06F 17/30008; G06F 17/30309; G06F 17/30575; G06F 17/30088
USPC ........ 707/640, 646, 625, 999.204, 649, 758, 707/645; 711/162, 117; 718/104
See application file for complete search history.

(56) References Cited

U.S. PATENT DOCUMENTS

| | | | | |
|---|---|---|---|---|
| 5,835,953 | A * | 11/1998 | Ohran ........................... | 711/162 |
| 6,865,655 | B1 * | 3/2005 | Andersen ...................... | 711/162 |
| 7,707,184 | B1 * | 4/2010 | Zhang ................ | G06F 11/1435 |
| | | | | 707/645 |
| 7,761,456 | B1 * | 7/2010 | Cram .................. | G06F 11/1453 |
| | | | | 707/754 |
| 8,204,860 | B1 * | 6/2012 | Ferguson et al. ............. | 707/639 |
| 2004/0163009 | A1 * | 8/2004 | Goldstein et al. ................ | 714/6 |
| 2006/0235907 | A1 * | 10/2006 | Kathuria et al. .............. | 707/204 |
| 2010/0114828 | A1 * | 5/2010 | Persson ......................... | 707/640 |
| 2010/0179959 | A1 * | 7/2010 | Shoens ............. | G06F 17/30088 |
| | | | | 707/758 |
| 2010/0274983 | A1 * | 10/2010 | Murphy et al. ................ | 711/162 |
| 2011/0161299 | A1 * | 6/2011 | Prahlad et al. ............... | 707/649 |
| 2011/0161973 | A1 * | 6/2011 | Klots et al. ................... | 718/104 |
| 2012/0078855 | A1 * | 3/2012 | Beatty et al. ................. | 707/676 |
| 2012/0136834 | A1 * | 5/2012 | Zhao .................. | G06F 11/1453 |
| | | | | 707/649 |
| 2012/0179655 | A1 * | 7/2012 | Beatty et al. ................. | 707/646 |
| 2012/0209809 | A1 * | 8/2012 | Prahlad et al. ............... | 707/625 |
| 2012/0233417 | A1 * | 9/2012 | Kalach et al. ................ | 711/162 |

* cited by examiner

*Primary Examiner* — Grace Park
*Assistant Examiner* — John J Morris
(74) *Attorney, Agent, or Firm* — Wilmer Cutler Pickering Hale and Dorr LLP

(57) ABSTRACT

Techniques for performing an incremental backup are disclosed. In one particular exemplary embodiment, the techniques may be realized as a method for performing an incremental backup comprising retrieving a first identifier from a first portion of a prior backup of a database, backing up a first portion of a snapshot of the database, retrieving, using at least one computer processor, a second portion of the snapshot of the database, determining whether a second identifier of the second portion of the snapshot of the database is greater than the first identifier, and in the event the second identifier is greater than the first identifier, backing up the second portion of the snapshot of the database.

20 Claims, 4 Drawing Sheets

TECHNIQUES FOR PERFORMING AN INCREMENTAL BACKUP

FIELD OF THE DISCLOSURE

The present disclosure relates generally to database backups and, more particularly, to techniques for performing an incremental backup.

BACKGROUND OF THE DISCLOSURE

Some applications may provide limited backup capability. For example, an application may store data in a page-based database, and the application may not natively provide an incremental backup of a snapshot or a point-in-time backup. Full backups require more space and time to perform.

In view of the foregoing, it may be understood that there may be significant problems and shortcomings associated with current incremental backup technologies.

SUMMARY OF THE DISCLOSURE

Techniques for performing an incremental backup are disclosed. In one particular exemplary embodiment, the techniques may be realized as a method for performing an incremental backup comprising retrieving a first identifier from a first portion of a prior backup of a database, backing up a first portion of a snapshot of the database, retrieving, using at least one computer processor, a second portion of the snapshot of the database, determining whether a second identifier of the second portion of the snapshot of the database is greater than the first identifier, and in the event the second identifier is greater than the first identifier, backing up the second portion of the snapshot of the database.

In accordance with other aspects of this particular exemplary embodiment, the techniques may further comprise retrieving one or more additional portions of the snapshot of the database, determining, for each of the one or more additional portions, that a third identifier of at least one of the one or more additional portions is greater than the first identifier, and backing up the at least one of the one or more additional portions.

In accordance with further aspects of this particular exemplary embodiment, the first identifier and the second identifier may comprise sequential numbers.

In accordance with additional aspects of this particular exemplary embodiment, the first identifier and the second identifier may comprise timestamps.

In accordance with additional aspects of this particular exemplary embodiment, the first portion of the prior backup of the database may comprise a database header.

In accordance with additional aspects of this particular exemplary embodiment, the first portion of the snapshot of the database may comprise a database header.

In accordance with additional aspects of this particular exemplary embodiment, the first portion and the second portion may comprise pages.

In accordance with additional aspects of this particular exemplary embodiment, the determination may comprise requesting a full backup from an application storing data in a collection of pages, and parsing the full backup as received to compare an identifier of each page with the first identifier, wherein pages having an identifier greater than the first identifier are stored as part of an incremental backup and pages having an identifier less than or equal to the first identifier are ignored.

In accordance with additional aspects of this particular exemplary embodiment, the techniques may further comprise using a stream of backup portions to create a virtual database image.

In accordance with additional aspects of this particular exemplary embodiment, the virtual database image may be created using a virtual file filter.

In accordance with additional aspects of this particular exemplary embodiment, the techniques may further comprise storing an offset with the backup of the first portion of the snapshot of the database, wherein the offset indicates a location of the second portion within a full backup of the database.

In accordance with additional aspects of this particular exemplary embodiment, the techniques may further comprise restoring the database using the full backup and the backup of the second portion, wherein the offset indicates a location of portion of the full backup to be updated by the backup of the second portion.

In accordance with additional aspects of this particular exemplary embodiment, the techniques may be realized as at least one non-transitory processor readable storage medium storing a computer program of instructions configured to be readable by at least one processor for instructing the at least one processor to execute a computer process for performing the method.

In another particular exemplary embodiment, the techniques may be realized as an article of manufacture for performing an incremental backup. The article of manufacture may comprise at least one non-transitory processor readable storage medium, and instructions stored on the at least one medium. The instructions may be configured to be readable from the at least one medium by at least one processor and thereby cause the at least one processor to operate so as to retrieve a first identifier from a first portion of a prior backup of a database, back up a first portion of a snapshot of the database, retrieve a second portion of the snapshot of the database, determine whether a second identifier of the second portion of the snapshot of the database is greater than the first identifier, and in the event the second identifier is greater than the first identifier, back up the second portion of the snapshot of the database.

In yet another particular exemplary embodiment, the techniques may be realized as a system for performing an incremental backup. The system may comprise one or more processors communicatively coupled to a network; wherein the one or more processors are configured to retrieve a first identifier from a first portion of a prior backup of a database, back up a first portion of a snapshot of the database, retrieve a second portion of the snapshot of the database, determine whether a second identifier of the second portion of the snapshot of the database is greater than the first identifier, and in the event the second identifier is greater than the first identifier, back up the second portion of the snapshot of the database.

In accordance with additional aspects of this particular exemplary embodiment, the processors may be further configured to retrieve one or more additional portions of the snapshot of the database, determine, for each of the one or more additional portions, that a third identifier of at least one of the one or more additional portions is greater than the first identifier, and back up the at least one of the one or more additional portions.

In accordance with additional aspects of this particular exemplary embodiment, the first identifier and the second identifier may comprise at least one of sequential numbers and timestamps.

In accordance with additional aspects of this particular exemplary embodiment, the first portion of the prior backup of the database and the first portion of the snapshot may comprise a database header.

In accordance with additional aspects of this particular exemplary embodiment, the determination may comprises requesting a full backup from an application storing data in a collection of pages, and parsing the full backup as received to compare an identifier of each page with the first identifier, wherein pages having an identifier greater than the first identifier are stored as part of an incremental backup and pages having an identifier less than or equal to the first identifier are ignored.

In accordance with additional aspects of this particular exemplary embodiment, the techniques may further comprise storing an offset with the backup of the first portion of the snapshot of the database, wherein the offset indicates a location of the second portion within a full backup of the database.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
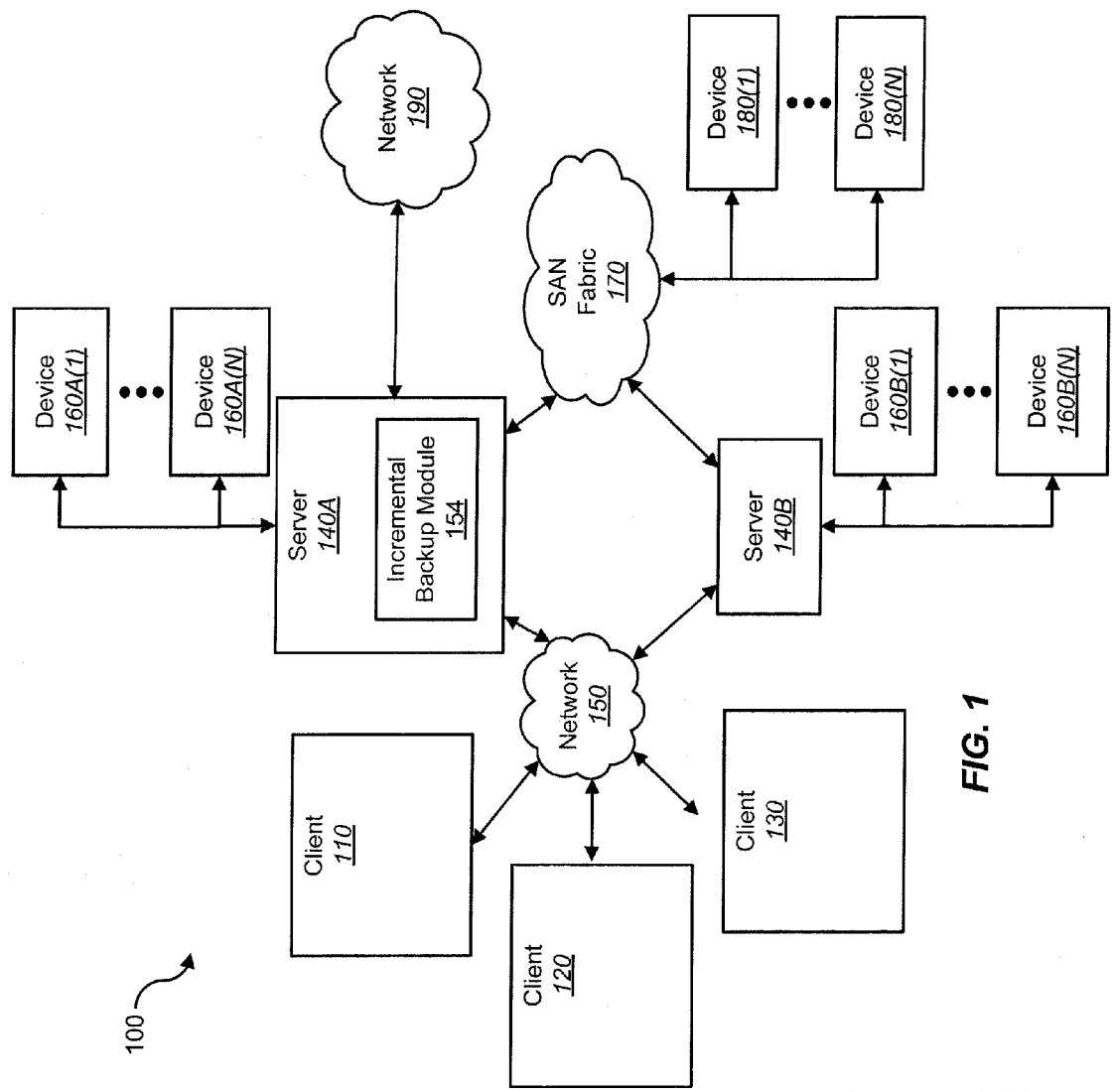
FIG. 1 shows a block diagram depicting a network architecture for performing an incremental backup in accordance with an embodiment of the present disclosure.

FIG. 1 shows a block diagram depicting a network architecture 100 for performing an incremental backup in accordance with an embodiment of the present disclosure. Figure is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., incremental backup module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
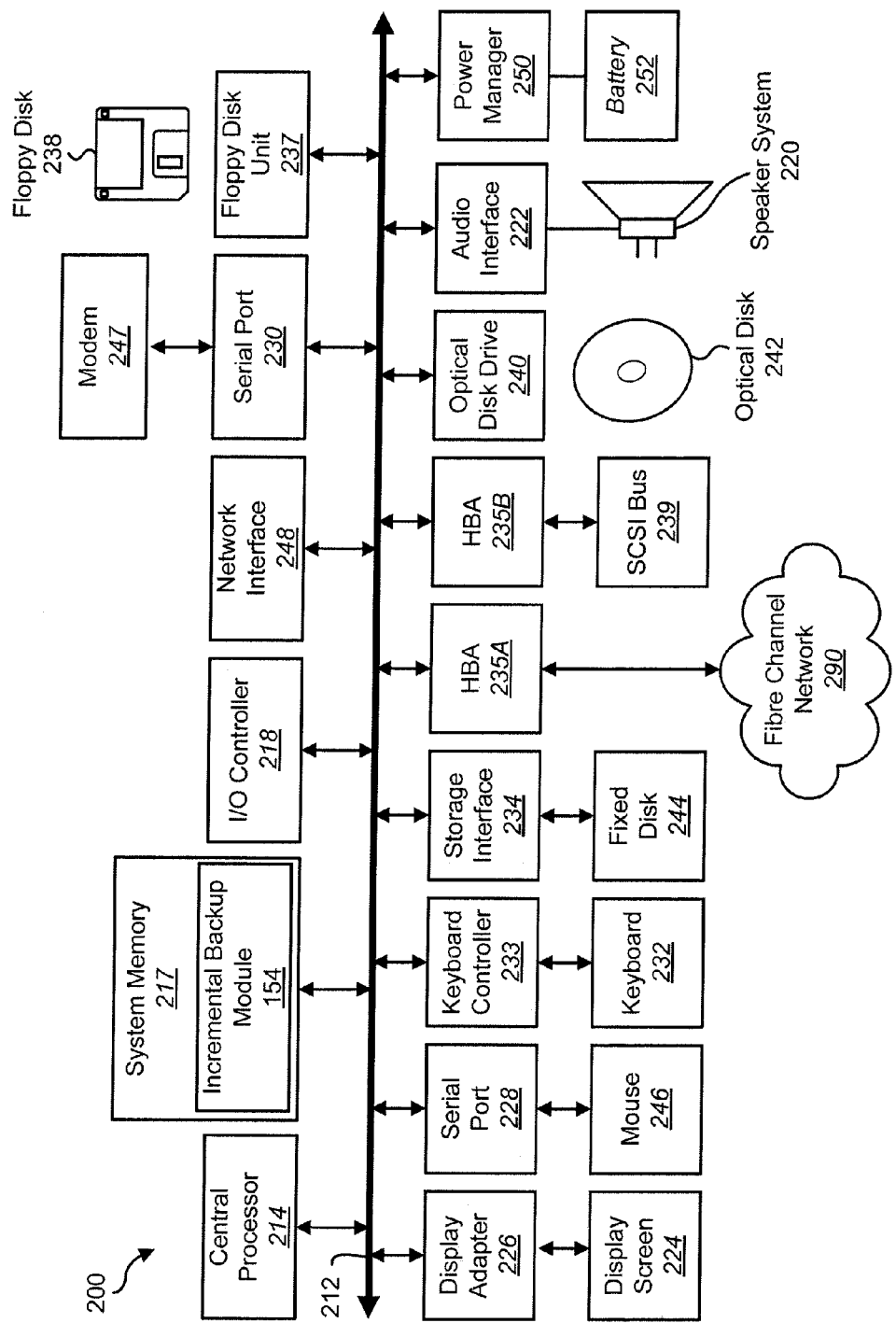
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for performing an incremental backup such as, for example, incremental backup module 154. As illustrated, one or more portions of incremental backup module 154 may reside at a network centric location. For example, server 140A may be a server, a firewall, a gateway, or other network element that may perform one or more actions to perform an incremental backup. According to some embodiments, network 190 may be an external network (e.g., the Internet) and server 140A may be a gateway or firewall between one or more internal components and clients and the external network.

Certain applications may store data in proprietary formats and may not provide incremental backup capabilities. For example, Microsoft® Exchange may not provide a backup allowing for a point in time recovery. Additionally, support for backups from snapshots may be limited.

Incremental backup module 154 may provide an incremental backup of a database. Incremental backup module 154 may determine whether a full backup exists. If a full backup does not exist, incremental backup module 154 may initiate one. If a full backup is initiated, incremental backup module 154 may save a backup identifier of the backup. A backup identifier may be a timestamp, a unique number, or another version identifier sufficient to distinguish a backup order. A backup identifier for a database may be obtained from a database header. According to some embodiments, incremental backup module 154 may also use a database signature or other indicia to first ensure that a backup and/or snapshot corresponds to a particular database.

If a full backup does exist, incremental backup module 154 may initiate or receive a snapshot of a database containing modifications made subsequent to the full backup. Incremental backup module 154 may retrieve an identifier of a last backup (e.g., a DBTIME value, a sequential number, or a timestamp from a full backup). According to some embodiments, a first two pages of a database file may be a database header and a shadow copy of the database header. The database header page may have a header on the page that may contain a identifier indicating an update time, an update version, a date stamp, or another indicator of the most recent update for the database.

After retrieving an identifier indicating the last update from the full backup, incremental backup module 154 may begin parsing a subsequent snapshot of the database. Incremental backup module 154 may save a first portion of a snapshot, which may contain database header information (e.g., a first page and a shadow page). Incremental backup module 154 may iterate through portions of a database in a snapshot (e.g., sequentially reading pages). For each portion, incremental backup module 154 may compare an identifier of the portion (e.g., a timestamp or a sequential number) to see if the identifier of the portion is greater than an identifier of the last update from the full backup. If the identifier of the portion of the snapshot is greater than the identifier of the last update from the full backup, it may indicate that the portion of the snapshot has been modified subsequent to the full backup. If a portion of the snapshot has been modified subsequent to the full backup, incremental backup module 154 may include that portion of the snapshot in an incremental backup. Changed portions may be buffered to prepare a changed portion stream.

Incremental backup module 154 may record a file offset or another indicator of a place in a full backup where a changed portion was identified. An identified offset or other indicator may allow a changed portion to be inserted into or applied as an update to a portion of a full backup.

According to some embodiments, while parsing the portions of the snapshot to identify changed portions of the database, incremental backup module 154 may verify the integrity of the portions (e.g., pages). For example, checksum or a signature in header of a portion may be verified against a body of a portion.

In one or more embodiments, incremental backup module 154 may provide a stream of changed portions to a hypervisor, a virtual machine agent, or other virtual machine infrastructure. A stream of changed portions may be used to construct or update a virtual database image. In some embodiments, a virtual file filter may be used to generate a virtual database image. Incremental backup module 154 may be used to generate a virtual database image to bring on-line a virtual machine hosting the backed up database at a particular point in time (e.g., the point in time of a snapshot).

Incremental backup module 154 may track which logs are needed for a particular point in time. For example, incremental backup module 154 may generate an incremental backup by identifying changed portions as discussed above and may determine which log files are needed if any. Incremental backup module 154 may record a current log number, a number of records to delete, a number of logs to include with a backup, log identifiers, or other indicia of a current log status. This may prevent the transfer of unneeded log files and/or the loss of required log files for an incremental backup.

Incremental backup module 154 may restore a backup using a full backup and an incremental backup generated as described above. Incremental backup module 154 may restore a full backup and may use identified offsets and corresponding backed up changed portions to update the full backup with identified incremental changes.

According to some embodiments, incremental backup module 154 may be implemented as an agent. Incremental backup module 154 may persist changed portions as a variable length stream.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, incremental backup module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptible Power Supply (UPS) located either local to or remote from computer system 200. In such embodiments, power manager 250 may provide information about a power level of an UPS.

Figure 3:
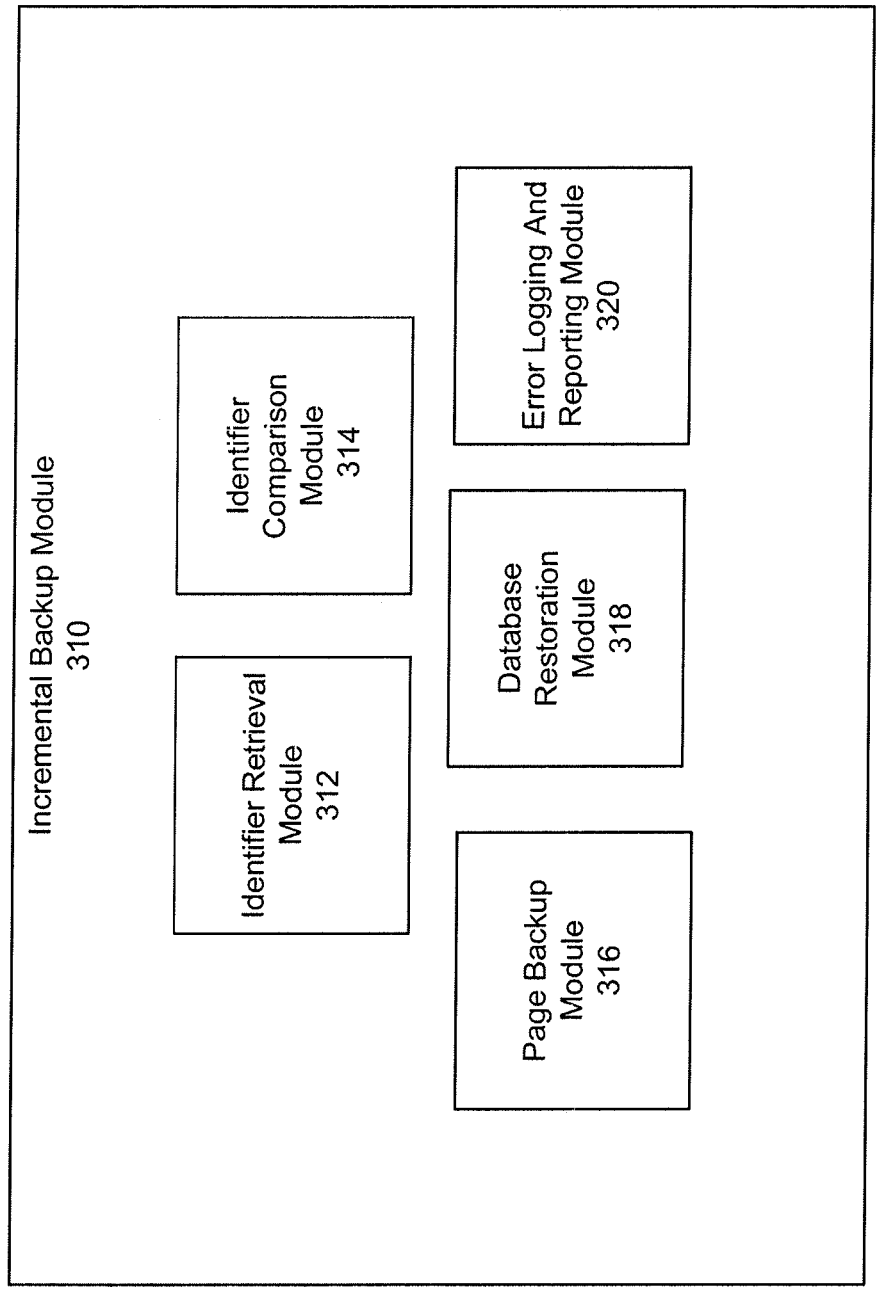
FIG. 3 shows a module for performing an incremental backup in accordance with an embodiment of the present disclosure.

Referring to FIG. 3, there is shown a incremental backup module 310 in accordance with an embodiment of the present disclosure. As illustrated, the incremental backup module 310 may contain one or more components including identifier retrieval module 312, identifier comparison module 314, page backup module 316, database restoration module 318, and error logging and reporting module 320.

The description below describes network elements, computers, and/or components of a system and method for performing an incremental backup that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Identifier retrieval module 312 may parse a backup, file, a snapshot, or other electronic storage to retrieve a version identifier for one or more portions of backup data. A backup identifier may be a timestamp, a unique number, or another version identifier sufficient to distinguish a backup order. A backup identifier for a database may be obtained from a database header. According to some embodiments, identifier retrieval module 312 may also use a database signature or other indicia to first ensure that a backup and/or snapshot corresponds to a particular database.

Identifier retrieval module 312 may retrieve an identifier of a last backup (e.g., a DBTIME value, a sequential number, or a timestamp from a full backup). According to some embodiments, a first two pages of a database file may be a database header and a shadow copy of the database header. The database header page may have a header on the page that may contain a identifier indicating an update time, an update version, a date stamp, or another indicator of the most recent update for the database.

Identifier comparison module 314 may parse a snapshot of a database. Identifier comparison module 314 send one or more portions to page backup module 316 for backup. Identifier comparison module 314 may iterate through portions of a database in a snapshot (e.g., sequentially reading pages). For each portion, identifier comparison module 314 may compare an identifier of the portion (e.g., a timestamp or a sequential number) to see if the identifier of the portion is greater than an identifier of the last update from the full backup. If the identifier of the portion of the snapshot is greater than the identifier of the last update from the full backup, it may indicate that the portion of the snapshot has been modified subsequent to the full backup. If a portion of the snapshot has been modified subsequent to the full backup, identifier comparison module 314 may send that portion of the snapshot to page backup module 316.

Identifier comparison module 314 may determine a file offset or another indicator of a place in a full backup where a changed portion was identified. An identified offset or other indicator may allow a changed portion to be inserted into or applied as an update to a portion of a full backup. Offset information may be sent to page backup module 316 together with corresponding changed portion data.

According to some embodiments, while parsing the portions of the snapshot to identify changed portions of the database, identifier comparison module 314 may verify the integrity of the portions (e.g., pages). For example, checksum or a signature in header of a portion may be verified against a body of a portion.

In one or more embodiments, identifier comparison module 314 may provide a stream of changed portions to a hypervisor, a virtual machine agent, or other virtual machine infrastructure. A stream of changed portions may be used to construct or update a virtual database image. In some embodiments, a virtual file filter may be used to generate a virtual database image. Identifier comparison module 314 may be used to generate a virtual database image to bring on-line a virtual machine hosting the backed up database at a particular point in time (e.g., the point in time of a snapshot).

Page backup module 316 may save a first portion of a snapshot, which may contain database header information (e.g., a first page and a shadow page). Page backup module 316 may backup portions of a database identified as changed by identifier comparison module 314. Changed portions may be buffered to prepare a changed portion stream.

Page backup module 316 may track which logs are needed for a particular point in time. For example, page backup module 316 may determine which log files are needed if any. Page backup module 316 may record a current log number, a number of records to delete, a number of logs to include with a backup, log identifiers, or other indicia of a current log status. This may prevent the transfer of unneeded log files and/or the loss of required log files for an incremental backup.

Database restoration module 318 may restore a backup using a full backup and an incremental backup generated as described above. Database restoration module 318 may restore a full backup and may use identified offsets and corresponding backed up changed portions to update the full backup with identified incremental changes.

Error logging and reporting module 320 may produce logs, reports, or other information associated with performing an incremental backup.

Figure 4:
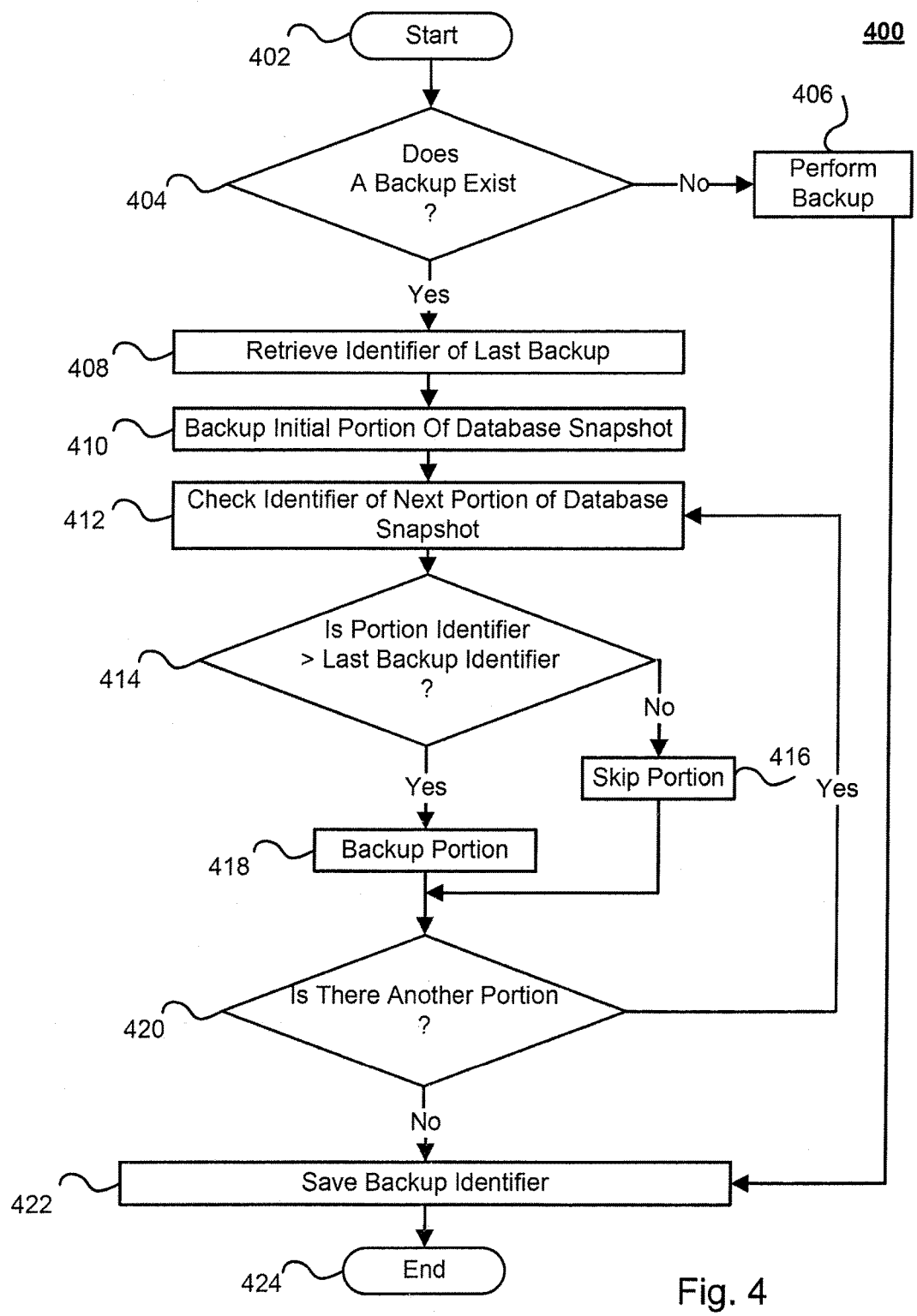
FIG. 4 depicts a method for performing an incremental backup in accordance with an embodiment of the present disclosure.

Referring to FIG. 4, there is depicted a method 400 for performing an incremental backup in accordance with an embodiment of the present disclosure. At block 402, the method 400 may begin.

At block 404, it may be determined whether a backup exists (e.g., a full backup). If a backup exists the method 400 may continue at block 408. If a backup does not exist, the method 400 may continue at block 406. At block 406, a backup (e.g., a full backup) may be performed.

At block 408, an identifier of a last backup may be retrieved. A backup, a snapshot, or other electronic storage may be parsed to retrieve a version identifier for one or more portions of backup data. A backup identifier may be a timestamp, a unique number, or another version identifier sufficient to distinguish a backup order. A backup identifier for a database may be obtained from a database header. A database signature or other indicia may also be used to first ensure that a backup and/or snapshot corresponds to a particular database.

At block 410, an initial portion of a database snapshot may be backed up. According to some embodiments, a first two pages of a database file may be a database header and a shadow copy of the database header. The database header page may have a header on the page that may contain a identifier indicating an update time, an update version, a date stamp, or another indicator of the most recent update for the database.

At block 412, a snapshot of a database may be parsed to compare versions of portions of the snapshot against a backup of the database. A snapshot may be iterated though to compare portions of the database (e.g., sequentially reading pages). For each portion an identifier of the portion (e.g., a timestamp or a sequential number) may be compared to see if the identifier of the portion is greater than an identifier of the last update from the full backup.

At block 414, it may be determined if an identifier of a portion of the snapshot is greater than an identifier of the last update from the full backup. If an identifier of a portion of the snapshot is greater than an identifier of the last update from the full backup, it may indicate that the portion of the snapshot has been modified subsequent to the full backup and the method 400 may continue at block 418. If an identifier of a portion of the snapshot is less than or equal to an identifier of the last update from the full backup, the portion may be skipped at block 416.

At block 418, a portion of the snapshot, identified as modified subsequent to the full backup, may be backed up.

At block 420, it may be determined if there is another portion of a snapshot to be evaluated. If there is remaining data to be evaluated, the method 400 may return to block 412. If the evaluation of the snapshot is complete, the method may continue at block 422.

At block 422, an identifier of the latest modification may be saved. According to some embodiments, this may be a sequential number or a timestamp which may be located in a header of a database.

At block 424, the method 400 may end.

At this point it should be noted that performing an incremental backup in accordance with the present disclosure as described above typically involves the processing of input data and the generation of output data to some extent. This input data processing and output data generation may be implemented in hardware or software. For example, specific electronic components may be employed in an incremental backup module or similar or related circuitry for implementing the functions associated with performing an incremental backup in accordance with the present disclosure as described above. Alternatively, one or more processors operating in accordance with instructions may implement the functions associated with performing an incremental backup in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for performing an incremental backup comprising:
   retrieving a first identifier for a first portion of a prior full backup of a database, wherein retrieving the first identifier comprises parsing the first portion of the prior full backup of the database to identify the first identifier;
   backing up a first portion of a snapshot of the database;
   retrieving, using at least one computer processor, a second identifier of a second portion of the snapshot of the database, wherein retrieving the second identifier of the second portion of the snapshot comprises parsing the snapshot to identify the second identifier by sequentially reading one or more pages stored in the snapshot, wherein parsing the snapshot comprises iteratively comparing versions of portions of the snapshot against a version of the backup of the database;
   determining whether the second identifier of the second portion of the snapshot of the database is greater than the first identifier;
   in the event the second identifier is less than or equal to the first identifier, indicating that the second portion of the snapshot has not been modified subsequent to the prior full backup, skip backing up the second portion of the snapshot of the database; and
   in the event the second identifier is greater than the first identifier, indicating that the second portion of the snapshot has been modified subsequent to the prior full backup,
       backing up the second portion of the snapshot of the database; and
       storing an offset with the backup of the first portion of the snapshot, wherein the offset indicates where the second portion of the snapshot is to be inserted into the prior full backup.

2. The method of claim 1, further comprising:
   retrieving one or more identifiers for additional portions of the snapshot of the database;
   determining, for each of the one or more additional portions, that a third identifier of at least one of the one or more additional portions is greater than the first identifier; and
   backing up the at least one of the one or more additional portions.

3. The method of claim 1, wherein the first identifier and the second identifier comprise sequential numbers.

4. The method of claim 1, wherein the first identifier and the second identifier comprise timestamps.

5. The method of claim 1, wherein the first portion of the prior backup of the database comprises a database header.

6. The method of claim 1, wherein the first portion of the snapshot of the database comprises a database header.

7. The method of claim 1, wherein the first portion and the second portion comprise pages.

8. The method of claim 2, wherein the determination that a third identifier of at least one of the one or more additional portions is greater than the first identifier comprises:
   requesting a full backup from an application storing data in a collection of pages; and
   parsing the full backup as received to compare an identifier of each page with the first identifier, wherein pages having an identifier greater than the first identifier are stored as part of an incremental backup and pages having an identifier less than or equal to the first identifier are ignored.

9. The method of claim 1, further comprising:
   using a stream of backup portions to create a virtual database image.

10. The method of claim 9, wherein the virtual database image is created using a virtual file filter.

11. The method of claim 8, further comprising:
    restoring the database using the full backup and the backup of the second portion, wherein the offset indicates a location of portion of the full backup to be updated by the backup of the second portion.

12. At least one non-transitory processor readable storage medium storing a computer program of instructions configured to be readable by at least one processor for instructing the at least one processor to execute a computer process for performing the method as recited in claim 1.

13. The method of claim 1, further comprising:
    verifying integrity of the second portion of the snapshot using a checksum of the first portion of the snapshot.

14. The method of claim 1, further comprising:
    verifying, using a database signature of the snapshot, that the snapshot corresponds to the database.

15. An article of manufacture for performing an incremental backup, the article of manufacture comprising:
    at least one non-transitory processor readable storage medium; and
    instructions stored on the at least one medium;
    wherein the instructions are configured to be readable from the at least one medium by at least one processor and thereby cause the at least one processor to operate so as to:
        retrieve a first identifier for a first portion of a prior backup of a database, wherein retrieving the first identifier comprises parsing the first portion of the prior full backup of the database to identify the first identifier;
        back up a first portion of a snapshot of the database;
        retrieve a second identifier of a second portion of the snapshot of the database, wherein retrieving the second identifier of the second portion of the snapshot comprises parsing the snapshot to identify the second identifier by sequentially reading one or more pages stored in the snapshot, wherein parsing the snapshot comprises iteratively comparing versions of portions of the snapshot against a version of the backup of the database;
        determine whether the second identifier of the second portion of the snapshot of the database is greater than the first identifier;
        in the event the second identifier is less than or equal to the first identifier, indicating that the second portion of the snapshot has not been modified subsequent to the prior full backup, skip backing up the second portion of the snapshot of the database; and
        in the event the second identifier is greater than the first identifier, indicating that the second portion of the snapshot has been modified subsequent to the prior full backup,
            back up the second portion of the snapshot of the database; and
            store an offset with the backup of the first portion of the snapshot, wherein the offset indicates where the second portion of the snapshot is to be inserted into the prior full backup.

16. A system for performing an incremental backup comprising:

one or more processors communicatively coupled to a network; wherein the one or more processors are configured to:
- retrieve a first identifier for a first portion of a prior backup of a database, wherein retrieving the first identifier comprises parsing the first portion of the prior full backup of the database to identify the first identifier;
- back up a first portion of a snapshot of the database;
- retrieve a second identifier of a second portion of the snapshot of the database, wherein retrieving the second identifier of the second portion of the snapshot comprises parsing the snapshot to identify the second identifier by sequentially reading one or more pages stored in the snapshot, wherein parsing the snapshot comprises iteratively comparing versions of portions of the snapshot against a version of the backup of the database;
- determine whether the second identifier of the second portion of the snapshot of the database is greater than the first identifier; and
- in the event the second identifier is less than or equal to the first identifier, indicating that the second portion of the snapshot has not been modified subsequent to the prior full backup, skip backing up the second portion of the snapshot of the database; and
- in the event the second identifier is greater than the first identifier, indicating that the second portion of the snapshot has been modified subsequent to the prior full backup,
  - back up the second portion of the snapshot of the database; and
  - store an offset with the backup of the first portion of the snapshot, wherein the offset indicates where the second portion of the snapshot is to be inserted into the prior full backup.

17. The system of claim 16, wherein the processors are further configured to:
- retrieve identifiers for one or more additional portions of the snapshot of the database;
- determine, for each of the one or more additional portions, that a third identifier of at least one of the one or more additional portions is greater than the first identifier; and
- back up the at least one of the one or more additional portions.

18. The system of claim 16, wherein the first identifier and the second identifier comprise at least one of sequential numbers and timestamps.

19. The system of claim 16, wherein the first portion of the prior backup of the database and the first portion of the snapshot comprises a database header.

20. The system of claim 17, wherein the determination that a third identifier of at least one of the one or more additional portions is greater than the first identifier comprises:
- requesting a full backup from an application storing data in a collection of pages; and
- parsing the full backup as received to compare an identifier of each page with the first identifier, wherein pages having an identifier greater than the first identifier are stored as part of an incremental backup and pages having an identifier less than or equal to the first identifier are ignored.

* * * * *